INVENTOR.
JOHN KOSAR

INVENTOR.
JOHN KOSAR

3,443,713
CORNERED BLANKS FOR CLOSURE CAPS, LINERS, WASHERS, ETC., PLUS METHOD OF BLANKING AND FORMING THE BLANKS AND UTILIZING THE CORNERS THEREOF

John Kosar, Anchor Engineering Co., 29—09 Bridge Plaza N., Long Island City, N.Y. 11101
Continuation of application Ser. No. 337,880, Jan. 15, 1964, which is a continuation-in-part of application Ser. No. 121,570, July 3, 1961. This application Dec. 21, 1966, Ser. No. 605,132
Int. Cl. B65d 45/02, 45/22, 45/28
U.S. Cl. 215—43                                                10 Claims This is a continuation of Ser. No. 337,880 filed Jan. 15, 1964 now abandoned which in turn is a continuation-in-part of Ser. No. 121,570, filed July 3, 1961 and now abandoned.

This invention relates to: (1) sheet metal closure caps for either glass, plastic or metal containers; (2) sealing liners for use in sheet metal or plastic closure caps, etc.; (3) washers for use under nuts, screw- or bolts-heads, etc.; (4) cups, lids, covers, disks, made of paper, sheet metal, etc.; (5) hoods for milk bottles, etc.; (6) flanges, eyelets, ferrules, grommets, etc.; (7) dies for blanking of polygonal blanks without marginal waste of stock surrounding the punch; (8) dies for blanking and forming or drawing of polygonal blanks; (9) dies for blanking and bending of polygonal blanks; (10) roll-curling of flanged cylindrical shells having polygonal flange edges; (11) single and multi-row blanking of polygonal blanks; (12) multiple blanking of polygonal blanks from a single row blank stock; (13) blanking of a plurality of smaller blanks from a single and larger polygonal blank with a single punch; (14) blanking and forming or drawing of a plurality of polygonal blanks of same size with a single punch; (15) dies for blanking polgonal sealing liners and immediate insertion of same into closure caps.

It has hitherto been the practice to punch out round blanks from sheet material stock for direct use as liners, washers, disks, etc., while the sheet metal blanks for closure caps are immediately drawn over a die plug to be formed into flanged cylindrical cap shells. These cap shells are then fed into a rolling machine for roll-forming the skirt portion of the shell into screw caps, lug caps, pilferproof caps, etc. For example, to produce a sheet metal screw cap shown, the flanged shell is rolled to first curl the flange followed by simultaneous rolling of the knurls and the thread. Skirt formations in sheet metal cups which cannot be die-formed must also be produced by rolling.

Presently all cup-, lid- or closure cap-blanks, sealing liners, washers, etc., are round. This requires the punch to be also round and enter a corresponding round hole in a matrix which in cooperation with the punch cuts a round hole into the stock for producing the round blank within the outline of the punch. It is for this reason that sufficient stock must surround the punch in order to cut a blank all around, and which blank is equal to the diameter of the punch. It can, therefore, be seen that the portion of stock surrounding the punch is waste since only the portion of stock within the punch diameter is utilized.

On the other hand, a hexagonal blank for example may be punched out by a hexagonal punch entering a corresponding hexagonal hole in a matrix. Here again a given stock margin must surround the punch for producing the hexagonal blank within the hexagonal outline of the punch and the hole in matrix. The same is true with octagonal or any other polygonal blanks. Therefore, as a general statement it may be said that whenever a punch of a round, polygonal, or any other outline is designed to pierce a hole in a sheet material stock, it should be understood that a margin of said stock must surround the punch. Said margin, however, becomes waste if the blank within the outline of the punch is wanted.

Because of the above described marginal stock-waste surrounding the punch it is necessary to have a stock width which is substantially greater than the diameter or width of the blanks, and because of the marginal waste between the blanks it is necessary to also have a center distance from blank to blank which is substantially greater than the diameter or length of the blank, while a greater center distance automatically increases the feeding distance of stock from blank to blank.

It is a first and primary object of my invention to eliminate in whole or part the above described marginal stock waste surrounding the conventional round blanks to be punched out, by making my blanks other than round and severing them across stock. Accordingly, my blanks may be triangular, square, rectangular, hexagonal, octagonal, decagonal, dodecagonal, etc. The blank outline may also be that of a rhombus, a rhomboid or a trapezoid, etc. The blanks may have an elongated hexagonal, elongated, octagonal or stretched octagonal outline or the blanks may have two opposite sides circular. Square and rectangular blanks may have two or all four corners beveled; isosceles and right angle triangular blanks must have at least one corner truncated and be severed by a triangular punch which may have two opposite cutting edges to produce two blanks with each stroke of punch in order to eliminate waste between the blanks. In an isosceles triangular blank my stock width is equal to the distance between the truncated corner of two converging sides and the base opposite to it. In right angled triangular blanks my stock width is equal to two adjoining blanks which are divided by the diagonal of a square or rectangle in which the diagonal forms the hypotenuse of the two triangles or, in other words, the stock width is equal to the length of one of the two sides forming the right angle before the truncation of one or both corners.

In a square blank of single row blanking, my stock width and center distance is equal to the distance from one side to the opposite side, and in a rectangular blank the stock width is preferably equal to the distance from one short side to the opposite short side, while the center distance is equal to the distance from one long side of the opposite long side. The above is true whether the corners are beveled or not. In a hexagonal blank the stock width for single row blanking is equal to the distance across corners of blank while the center distance is equal to the distance across two opposite sides. In a regular octagonal blank for single row blanking, my stock width and center distance is equal to the distance across two opposite sides. In general it may be said that in single row blanking of one blank at a time one imaginary rearward side of the leading polygonal blank of rectangular, hexagonal or octagonal outline must lie transverse to the width of the stock in order to be severed by the punch cutting along that side only. On the other hand, the blanks for triangles, rhomboids, rhombuses, etc., are severed obliquely to the stock width.

A 2nd object is to have a stock width for either one, two, three, four, five, six, seven or more rows of blanking in which the leading blank of each row may be severed by a severance punch and immediately drawn over a die plug by said severance punch to form the blank into a cap or cup shell, etc.; or each leading blank may only be severed as is the case with flat washers, disks, etc. Such multi-row blanking is suitable primarily for square, rectangular, hexagonal, octagonal, decagonal, dodecagonal or other polygonal blanks with 14, 16, 18 or more corners of an even number.

In square, rectangular, or oblique angled parallelograms there is no waste in either single or multi-row blanking and only when the corners must be beveled is there a slight waste necessitated by the notching of lateral edges of stock in both single and multi-row blanking, and by the intermediate punching of one bevel of each four adjoining blanks in multi-row blanking. In multi-row blanking of non-beveled square or rectangular blanks, one leading blank must always be two blanks ahead of the adjoining leading blank in order to clear the severance punch, while in multi-row blanking with beveled corners one leading blank must only be one blank ahead of the adjoining leading blank since the holes formed by the intermediate punching of bevels provide clearance for the severance punches. The most advanced leading blank will only require a severance cut transverse to the stock while the adjoining leading blank requires a severance cut on two of its adjoining sides.

In single-row blanking of hexagonal and octagonal blanks a notching punch on both sides of stock must produce two of the sides of the hexagonal or octagonal blanks, that is, one side of the forward and one side of the adjoining rearward blank on both sides of stock while the severance punch only cuts the rearward side of either the hexagonal or octagonal leading blank.

In two-row blanking of hexagonal blanks there is no waste between the two rows of blanks and the leading blank of one row is 1½ times ahead of the leading blank in the other row. In the former, the severance punch has to cut one side only while in the latter the severance punch has to cut three sides of the hexagon. The same is true in a three-row blanking of hexagons. However, in a four-row blanking of hexagons one leading blank rearward of the two advanced leading blanks must have five sides cut by the severance punch. In a seven-row blanking of hexagons there are two leading blanks rearward of two advanced leading blanks which require five sides to be cut by the severance punch.

In two-row blanking of octagonal blanks the layout of the blanks may be in line transverse to the stock or the blanks may be overlappingly offset. In both cases there is a waste between the blanks which must be punched out. However, in the offset blanking this waste is somewhat less than half that of the former and accordingly the stock width is less in the latter. In the former, the advanced leading blank is severed at its rearward side which is transverse to the stock while the rearward leading blank is a one blank distance behind, and two of its sides must be cut by the severance punch. A square punch between the blanks forms one side of each four adjoining blanks. In the latter, the rearward leading blank is 1½ blank distance behind the advanced leading blank and must be severed at three of its sides, that is, one full side and two somewhat less than half sides, while a semi-square punch between the blank forms one half side of each of three adjoining blanks. The same is true in a three-row blanking.

In a four-row blanking of octagonal blanks arranged in juxtaposition, one leading blank rearward of and between the two advanced leading blanks has three sides to cut by the severance punch, while in a four-row blanking with the overlapping offset blanks the leading blanks rearward and between the two advanced leading blanks must be severed at five sides, that is, one rearward side and four somewhat less than half sides. The other portion of each of the four sides is cut by a triangular punch ahead of the severance.

In a seven-row blanking of octagonal blanks there is one more rearward leading blank which must have one full side and four somewhat less than half sides severed.

A 3rd object is to sever two blanks from a single row blank-stock with each stroke of a single punch by providing a severance or slot punch with two opposite cutting edges and which edges cut across the stock. Thus the severance punch cuts the rearward side of both the leading and the immediately succeeding blank. The severance punch may be called a slot punch instead. Accordingly, the notching punches must notch the lengthwise edge of both sides of stock for two blanks instead of one. This duplex blanking doubles the production and is especially suitable for blanks which remain flat such as washers, disks, nameplates, etc., and sealing liners which are not immediately inserted into bottle caps. The blanks in this duplex single-row blanking may be triangular, square, rectangular, hexagonal, octagonal, etc. The corners in square blanks may be beveled by notching or left sharp, or the square or rectangular blanks may have concaved or stepped corners as shown on drawing. By providing two duplex severance punches in a single-row blank-stock the production is increased to four blanks per stroke of the two punches.

A 4th object is to provide a punch which severs the leading blank while simultaneously cutting it in half. For example, a hexagonal or octagonal blank may also be cut in the middle and transverse to the stock to produce two equal halves of a hexagonal or octagonal blank and which halves may be used as special washers in which case holes for the bolt must be punched in the center of each half of blank.

A 5th object is to provide a square or other polygonal sealing liner for closure caps in place of the conventional round liner. In doing so, I obtain a two-way saving of liner material, that is, first, the elimination of the marginal waste surrounding the punch for round liners, and secondly, by the reduction of the basic or inscribed liner diameter portion from the inside diameter of the cap to a diameter which covers the mouth of the container plus a major portion of the end surface of container neck-wall. Allowing a radial waste margin of 1/16, a container thread projection of .047, and a 1/16 radial offset inward of the O.D. of container neck-wall, results in a radial reduction of .172 or a diametrical reduction of .344 of the conventional liner diameter. The conventional marginal waste is often as much as 1/8" and the container thread projection plus clearance between cap and thread may be as much as .084, and adding said 1/16" offset results in a radial reduction of .271 or in a diametrical reduction of .542 of present liner diameter.

The corners projecting from the basic or inscribed liner diameter are left long enough so as to be substantially greater than the I.D. of cap. This causes the prongs or corners to bend down over the outer corner of container neckwall thereby urging the cap to concentrically align with the container neck while the frictional engagement of the prongs with the cap skirt prevents the liner from falling out of the cap. Centering of cap is essential for obtaining a uniform compression of liner required for an effective seal, because of the round thread and tolerance of glass. Since the corners, projecting from the inscribed circle of a square liner blank do not affect the saving of material they may be left sharp or be beveled off more or less to suit the angle of the downward bend in the cap. The reduction of the basic liner diameter also reduces the center distance of the blanks and consequently also the feeding distance of the stock. The insertion of the liner into the cap is much easier since only the corners of the liner have to be bent. The die cost is substantially less since only a straight shearing cut across the stock is required to separate the leading blank from its stock and which shearing-cut actually produces the leading edge or leading side of the succeeding square liner blank without marginal waste therebetween.

No multiple die layout for multi-row blanking is required to obtain a greater saving of material since there is no waste material with a single die and a single-row blanking.

A 6th object is to provide square or other polygonal sheet metal blanks for forming closure caps in place of the conventional round blanks. In doing so I obtain a double saving of cap metal and, that is, first thru the elimination of the marginal waste surrounding the punch of conventional round blanks and secondly thru the utilization of the corners of my square or other polygonal blanks which corners project from their basic or inscribed circle. The corners of a square blank may be left pointed or be beveled off in which case notching of the lateral edges of stock is required. The four corners of square blanks may be utilized to form lugs for engaging in whole or part four lugs projecting from a container neck.

A square blank may have two opposite corners notched off leaving only two diametrically opposite corners which may be utilized to form two lugs for engaging two lugs projecting from a container neck.

The corners of a hexagonal blank may be utilized to form lugs for engaging six lugs projecting from a container neck. In either case, the four, two or six corners must be invertedly curled that is, after the drawing of the blanks over a die plug immediately following the severance of the leading blanks from its stock by the same punch. The drawing of the blank over the plug produces a flanged cylindrical shell. The flange projects radially from the mouth edge of shell and may have two, four, or six corners projecting from the basic flange edge. The corners projecting from the basic flange edge are downwardly curved in order to facilitate the initial curling of the flange in the rolling machine.

The flange is invertedly roll-curled to produce inwardly projecting lugs supported by an outwardly projecting annular bulge portion of flange or the bulge portion may be rolled flush with the skirt of cap above. A bulge, however, is desirable in that it imparts resilience into the cap-skirt while preventing cracking of the enamel coating on the exterior of cap especially at the root radius of flange connecting with the skirt of cap. The curled corner portions of cap-flange may be rolled so as to directly engage the underside of container lugs or the corners may be additionally roll-curled so as to prevent their direct engagement with the container lugs. In this latter case the saving of material would only be in the elimination of the marginal stock waste of blank.

A 7th object is to use an octagonal sheet metal blank for forming a cylindrical cap shell, having a radially projecting basic flange diameter having eight downwardly curved corner portions projecting from the basic flange edge. In invertedly roll-curling this flange I aim to produce an outwardly bulging flange-portion with eight inwardly extending curled corner portions which are rolled to be flush with the inside diameter of cap-skirt above, in order to facilitate the initial engagement with container neck having an annular groove forming a shoulder above similar to that of beer and soda bottles, however the curled corner portions may extend slightly inwardly of the I.D. of cap for snap engagement with container neck. A polygonal cork liner is compressed by the cap over the end-surface of neck upon downwardly moving a sealing chuck having ribbed lateral means and which ribbed means are initially beveled to first make wedging contact with the upper portion of said bulge, and which ribbed means move downwardly thereby urging said bulge to move inwardly and causing said curled corner portions to firmly engage said shoulder while said ribbed means form vertical grooves around the exterior of said bulge. The forming of said vertical grooves in said bulge absorbs the difference in circumference caused by the reduction of the bulge diameter resulting in easier reduction of the bulge diameter. The cap may instead have more than 8 corner portions.

An 8th object is to produce a cap somewhat similar to the conventional crown cap except that my crown cap has preferably 8 ribs instead of the 21 ribs in the conventional crown caps. Accordingly, my crown cap is made from an octagonal blank which after severance from its stock is immediately drawn over a die-plug by the severance punch. The bore of the severance punch has 8 grooves which coincide with the location of the 8 corners of the octagonal blank. In the downward stroke of the punch the 8 corners of the blank automatically enter the grooves of the punch urged by the resistance against the drawing of the blank over the die-plug and the tendency to form wrinkles.

In this 8-rib crown cap the saving of material is primarily in the elimination of the marginal waste and having a polygonal cork liner constitutes another substantial saving. The application of this cap is practically the same as that of the conventional crown cap in that a sealing chuck engages and wedges over the crest of the cap-ribs thereby urging the skirt portions of cap between the ribs to engage the shoulder formed by the annular groove in container neck. The cap may instead have more than 8 ribs produced from a blank having more than 8 corners and the corner portions of blank may instead be between the ribs of cap.

Blanks having more than 8 corners such as decagons, dodecagons, etc., requir enotching punches which cut four sides of the blank at each side of stock. However, it is best to provide two notching punches i.e., one before the other and each cutting only two sides of a decagon, etc. In using a decagonal or a dodecagonal blank my crown cap may have 10 or 12 ribs instead of 8. Odd number of polygons such as pentagons, heptagons, nonagons, etc., are less practical since they require truncations of two opposite corners in order to provide sufficient surface connection between the blanks for notching and transverse severance of the leading blank.

A 9th object is to use my polygonal blanks also in the production of regular screw caps, lug caps, pilferproof caps, etc., either with a regular or with an inwardly curled flange edge. For the regular curled edge the corner portions of flange are curved upwardly and that for the inverted curl curved downwardly for the purpose of facilitating the initial roll-curling of the polygonal flange edge of shell. The basic flange projection for the inverted curl must be greater and the shell height smaller than that for the regular curl in order to allow for the increase in height of cap as a result of the inverted or downward curling of flange. In both cases the saving of material lies in the elimination of the marginal waste unless the invertedly curled corner portions are utilized to form lugs for lug caps. A pilferproof cap may not have a flange nor a curled edge and, therefore, its mouth edge must be trimmed to remove its unevenness. This must be done whether the shell is formed from a round or polygonal blank except that in the latter case the saving of the material lies in the absence of the marginal edge of the flat blank. In screw caps or lug caps with a regular or upwardly turned curl, the curled corner portions of shell must be curled-in with the basic flange edge.

A 10th object is to employ my polygonal blanks in the forming of cups made of aluminum, paper, etc. The flat blank may be square, rectangular, hexagonal, octagonal or triangular. However, in a triangular, square or rectangular blank the corners are preferably beveled, truncated, concaved or convexed. The cups may have the outline of an inverted truncated pyramid produced from a corresponding polygonal blank drawn to terminate in a free-ending level mouth-edge of the cup; or a polygonal blank may be drawn to produce a conical cup which terminal non-curled mouth edge may be more or less wavy, however increasing the conical angle reduces the waviness; or a polygonal blank may be drawn to produce a cylindrical cup body and its mouth edge curled-in to conceal the the polygonal flange edges, or the mouth edges may be turned down or turned radially outwardly to expose the polygonal flange edges. The mouth edge of a conical cup may likewise be curled-in, turned out or down if desired; or a polygonal blank may be drawn to produce a conical or cylindrical cup in which the side wall is tapering folded-in and rolled or pressed over, and the mouth edge curled-in to prevent the opening up of the folds; or a polygonal blank may be drawn to produce milk bottle hoods in which the side walls are similarly folded and rolled-in or pressed over and adhesive may be applied within the fold to prevent them from opening up; or a polygonal blank may be drawn to produce a conical or cylindrical cup in which the corners of the blank are pressed out by the die to form V-ribs or convex ribs in the skirt of cup, or such ribs may be automatically formed by allowing the corners of the blank to automatically enter such axial grooves cut into the wall of the punch bore since this is facilitated by the tendency to form wrinkles. However, the crest of the grooves in the punch should preferably be tapered or diverging toward the mouth of the punch bore and the taper of the crest of such grooves should preferably be an amount to result in a level mouth edge of cup.

An 11th object is to sever a plurality of overlying polygonal blanks by one severance punch and immediately push all said blanks down into a conical or cylindrical hole in a block below, said hole having upwardly diverging V- or concave-grooves cut into the side wall of said conical or cylindrical hole. A cylindrical or conical plug within said severance punch has a stroke long enough for pushing said blanks down past said hole and thereby forming said blanks into nesting crinkle cups which automatically drop down into a container after passing said block. Said V- or concave-grooves in the side wall of said hole are in alignment with the corners of the polygonal blanks severed by said punch so that the tendency to form wrinkles at the corners of blanks is compensated for. Instead of being plain cylindrical or plain conical said plug may instead have radial ribs to roughly conform with the grooves in the side wall of said hole.

A knockout pad within said conical plug may be used to eject the cups from said hole and such a pad may also be used within said cylindrical plug thereby shortening its stroke.

A 12th object is to construct covers or lids from polygonal blanks for covering or sealing the opening of cups suitable for a cup with a tapered wall-end, a dished lid having a conforming tapered side wall and a radial flange projecting outwardly from the top of said side wall is suitable for sealing the opening of said cup. Said flange to be formed out of the corners derived from the polygonal blank and serving to limit the engagement of said lid while said corners provide a convenient means for lifting the lid out of its engagement. The corners of said flange may be bent down to engage the outside diameter of either a single wall-end, a U-shaped wall-end, or a curled wall-end of cup. The cup may have an outwardly offset tapered wall-end which shoulder may be engaged by the bottom corner of said lid on the inside of cup.

A 13th object is the construction of a simple and inexpensive non-circular shearing die wherein the leading liner blank of a square or other polygonal outline is severed from its stock and immediately inserted into a closure cap below. The shearing die only cuts across the liner stock and a rod within the shearing punch pushes the severed liner immediately into a cap below. Said rod may have a disk at its lower end to exert a push over a greater area of the severed liner blank. In a square liner the corners may be beveled by a notching punch at both lateral edges of stock. The liner is usually fed from a roll of liner material mounted on a reel. In single roll blanking the width of the liner roll is cut to be equal to that of the extremities of the blank measured across the stock since there is no marginal waste across the stock except thru notching of square corners of blanks if such is required.

The stock is interruptedly fed a distance equal to the linear distance from blank to blank which is equal to the distance from side to side of the blank since there is no marginal waste between the blanks. After each feeding stroke the stock is clamped down by a spring-backed stripper to prevent movement of stock when the punch descends for severing the leading blank from its stock.

The shearing die has a bar at both sides of stock to guide and prevent the stock from lateral movement.

Aside from the substantial saving of liner material, the cost of my liner-die having a straight cutting edge is at least 50% less than that of a conventional liner die. This is because of the elimination of the circular cutting edge in both the punch and the matrix. The grinding and close fitting of the circular cutting edge in both the punch and the matrix is always a major expense in conventional liner dies. Consequently, the cost of maintenance of conventional circular shearing dies is substantially greater than that of a straight shearing die.

A punch piercing a round or polygonal hole in sheet-material stock must naturally be surrounded by a margin of said stock which may be situated between the holes pierced by said punch or between said holes and outer border of said stock. Such margin becomes waste if the blank pierced by said punch is wanted. On the other hand, my shearing punch (in a single row blanking) only cuts across the stock to separate the leading blank from the succeeding blank. Since there is no marginal waste between the blanks, the shearing punch actually forms the rearward side of a leading square or other polygonal blank and the forward side of the succeeding blank, while two sides of a square blank or the extremities of two opposite corners of a hexagonal blank, etc., are fixed or arrived at by the width of said stock.

My liner may be produced from a single or double row blanking stock and the liner blanks may be square, hexagonal or octagonal as required. However, a square liner is preferred since it can be produced with the least amount of waste if its corners are slightly beveled or with no waste if the corners are not beveled. An octagonal blank may be considered a square blank having its corners beveled to be tangent with its inscribed circle.

Blanking of liners from a double row blanking-stock is only practical if a liner blanked from each row is immediately inserted into each of two closure caps below while liners shipped to be sold may be produced from any number of rows of liner stock or such liners may be produced from a single row blank stock by one or more slot-punches each slot-punch producing two liners with each stroke. In a two or three row blanking of square liners the rearward leading blank is severed from its stock at two of its sides while in a two- or three-row blanking of hexagonal liners the rearward leading blank is severed at three of its sides. In multi-row blanking of hexagonal liners there is no waste of stock between the rows and since the only waste is caused by the notching of the longitudinal stock-edge it is economical to produce hexagonal liners or other blanks from as many rows as possible.

Since the diameter across the corners of my square or polygonal liner is substantially greater than the inside diameter of closure cap, it becomes necessary to automatically bend said corners during the insertion of the liner into the cap by said rod. Said corners remain bent-down in the cap because of said difference in diameter and serve to frictionally retain the liner in the cap while urging concentric alignment of cap with container neck. Adding to this functional advantage of my liner, the two-fold saving of liner material (as explained elsewhere) plus the substantial reduction of cost and maintenance of my liner die results in a most desirable advantage of my polygonal liner over the conventional round liner including the conventional liner die with the circular cutting edges in both punch and matrix.

A 14th object is to produce washers of square or other polygonal outline with a die smaller to that described for the liner in object 13 except omitting the rod within the shearing punch and adding a piercing punch to produce the bolt hole in the washer. Here again the polygonal washers may be produced from a single or multi-row blanking stock. The simplest and most economical way, however, is to produce triangular, square, hexagonal or other polygonal washers from a single row blanking-stock by one or more slot-punches, with each slot-punch producing two washers with each stroke except that for each slot punch there must be a duplex notching punch. An exception to that is when a slot punch divides a blank into two equal halves. For example, a hexagonal blank may be divided into two equal halves by one rectangular slot-punch, preceded by only one notching punch at each side of stock; or a square blank, having a V-groove or a bevel notched into two diagonally opposite corners, may be divided into equal halves by a triangular slot-punch cutting along said diagonal while severing the square blank from the succeeding blank notched in advance by only one notching punch at each side of stock; or a beveled or non-beveled square blank and also an octagonal blank may be divided into halves by a rectangular slot-punch cutting across the middle of two opposite sides of the leading blank while severing said leading blank from the succeeding blank notched in advance by only one notching punch at each side of stock, no notching being required for non-beveled square blanks. Each half of the above halved blanks may have a bolt hole punched while being notched in advance of the severance of the blanks.

The slot-punch referred to has either two opposite and parallel or two opposite and converging cutting edges both entering a corresponding matrix-slot having cooperating cutting edges for severing both opposite sides of a polygonal or triangular blank, or for dividing a blank into two equal halves. The slot-die is normally tilted to one side to permit the severed blanks to slide down and clear the way for the stock to be fed for the next stroke of punch. A washer serves to absorb the clamping pressure exerted by a nut, screw- or bolt-head while simultaneously tending to prevent loosening of same. My polygonal washer can absorb said pressure as well, while preventing loosening of nuts, etc., far better than round washers because of the corners projecting from the basic diameter and which corners provide a plurality of edges tending to prevent rotation of the washer, similar to ratchet teeth. Adding to this functional advantage the saving of material thru the elimination of the all around marginal stock waste associated with round blanks, plus the substantial saving in the cost and maintenance of the dies thru the elimination of the circular cutting edges of both the punch and matrix and replacement of same by simple and inexpensive straight shearing punches, greatly increases the advantages of my polygonal washers.

My polygonal blanks for washers may instead be used as nameplates, etc. by punching one or more holes around the edges or in the corners while eliminating the hole for the bolt, or the blanks for nameplates may have a rectangular outline.

A 15th object is the construction of a non-circular combination shearing and drawing die in which (in a single-row blank-stock) the leading sheet metal blank of a square or other polygonal outline is severed across the stock from the immediately succeeding blank, and the severed blank is immediately drawn over the die plug in cooperation with the bore of the shearing punch to form a flanged cylindrical cap-shell having a basic flange diameter projecting radially from the mouth edge of said shell while the corner portions of said polygonal blank project from the edge of said basic flange diameter. Said corner portions of flange are either curved upwardly by the die for facilitating the subsequent regular upward-inward roll-curing of flange, or said corner portions are curved downwardly by the die for facilitating a subsequent inverted roll-curling of the flange. (See objects 6, 7, and 9.) The usual strip stock is interruptedly fed a distance from center to center of blank and which distance is equal to the distance from one side of blank to the other side, measured lengthwise of said stock; and the width of said stock (for single-row blanking) is equal to the distance from side to side or from corner to corner of a polygonal blank measured across said stock.

As usual, the die is tilted to one side and the strip stock guided to prevent its lateral movement. At termination of each feeding stroke, a spring-backed stripped clamps the stock down against die-plate to prevent its movement during severance and drawing of each blank as well as during part of the upward stroke of punch. Notching punches for notching the stock in advance of the severance are attached to the punch holder. Thes severance-drawing punch may be of rectangular outline with only one straight side cutting across the stock in a single-row blank stock.

In a two- or three-row blank stock the punch has to sever two sides of a square and three sides of a hexagonal blank of the rearward leading blank or blanks. In all cases, however, the surrounding marginal waste associated with piercing, round or non-round punches is eliminated, resulting in substantial saving of sheet metal with each of my blanks. Adding to that the utilization of corner portions of blanks plus the elimination of the costly circular cutting edge in both punch and matrix, including the high upkeep of same, results in a great advantage of my die and polygonal blanks over the common circular blanks produced by circular cutting edges of a common die.

A 16th object is to produce a folded or U-shaped washer from a rectangular blank having its corners beveled thru notching while being notched at both longitudinal edges and medial thereof for facilitating said folding. A bolt hole is punched in both halves of said blank during said notching whereupon said blank is severed from its stock, followed by the folding of said blank into equal halves to result in axial alignment of said bolt holes. The U-shaped bend or fold provides resilience tending to prevent loosening of a nut or bolt-head.

A second fold may be added by the addition of one half of said rectangular blank and the total length of said blank may be equal to three square blanks in a row, severed from its stock at every third square blank and bent into a flattened S-shaped washer following the notching, punching of three holes and severance from said stock. In folding, each of three holes must be in axial alignment as well as the edges of each bend. Each of the two or three integral blanks may instead be hexagonal, octagonal, or triangular.

The above and other objects, features, and advantages of my present invention will become more readily apparent from the following description, reference being made to the accompanying drawing in which:

FIG. 1 is a fractional sectional elevation of a container neck which mouth is sealed by a conventional liner within a conventional sheet metal screw cap having a regular curled edge, whereas FIG. 1A shows an inverted curled edge.

FIG. 2 is a fractional sectional elevation of a container neck, liner and cap, like that in FIG. 1 except that the liner is shown with a bent down corner portion and that the regular curled edge and flange of cap is shown with a projecting corner portion, whereas FIG. 2A shows the inverted curled edge with a projecting corner portion.

FIG. 2D is a plan view showing the blanking of my square liner blanks.

FIG. 4A is a sectional elevation of a combination blanking and drawing die wherein the severed leading blank at section 4A of FIG. 4 is drawn over a plug to result in a cylindrical cap-shell at the basic flange diameter, while

FIG. 5 is a fractional sectional view of a cap shell having a regular curled edge, wherein the corner portions of flange are curved upwardly for upward-inward roll-curling of flange as shown in FIG. 5A, and wherein the curled edge of completed cap is notched as per FIG. 5B, by a notching blade shown in FIG. 5C.

FIG. 6 is a fractional sectional view of a cap shell having an inverted curled edge, wherein the corner portions of flange are curved downwardly for downward-inward roll-curling of flange as shown in FIG. 6A, and wherein the curled edge of completed cap is notched as per FIG. 6B or FIG. 6C by a notching blade shown in FIG. 5C.

FIG. 8 is a fractional sectional view of a completed lug cap in engagement with a lugged bottle neck sealed by a cornered liner compressed by the cap, and wherein the corner portions of cap flange are curved downwardly for inverted roll-curling of flange, and wherein said corner portions are additionally curled-in so that only the basic curled end-portion of flange projects inwardly past the I.D. of cap to form lugs for engaging the lugs in said neck, while the remainder of basic flange is rolled to form an annular bulge projecting outwardly from the O.D. of cap.

FIG. 8A shows the flattening of the curled, basic end-portion of flange between said lugs, so as to be flush with the I.D. of cap, while FIG. 8B is an inverted view of the lug formed during rolling, as a result of a recess provided in the rolling tool.

FIG. 9 is a fractional sectional elevation of a cap shown compressing a cornered cork liner against the mouth-end of a bottle neck for crown caps, and wherein the corner portions of cap-flange are downwardly curved for inverted roll-curling of flange, and wherein said corner portions are roll-curled to permit axial engagement of cap with said neck, while the basic flange portion is rolled to form an annular bulge projecting outwardly from the O.D. of cap. A sealing check having axial ribs, shown in engagement with said bulge causes said bulge to move inwardly during its downward stroke, while forming axial grooves in said bulge as shown in FIG. 9B. Said inward moving of bulge results in the engagement of said curled corner portion with said neck as shown in FIG. 9A. FIG. 9C is a modification of FIG. 9A.

FIG. 10 is a fractional sectional elevation of a crown cap shown compressing a cornered cork liner over the mouth-end of a bottle neck for crown caps. The skirt of cap is ribbed as per FIG. 10A, and which ribs are similar to the conventional crown cap except that they are formed out of a cornered blank, and which corners are positioned to be either within said ribs or between said ribs. A sealing chuck shown in phantom deflects the ribs inwardly thereby causing the metal between the ribs to engage the bottle neck.

FIG. 11 is a plan view of a hexagonal and FIG. 12 an octagonal blank, produced by notching of the stock and severance of the blank. Both blanks may be used for either forming caps or liners.

FIG. 13 is a sectional elevation of a combination blanking- and extrusion-die for producing cups made of paper or soft sheet metal, wherein either a single or a plurality of overlying polygonal blanks may be produced by one stroke of a single punch. A plug within the severance punch pushes the blanks thru an extrusion hole in a block below. Said hole may be cylindrical or tapered and having a plurality of upwardly diverging, concave- or V-grooves cut into the side wall formed by said hole. Said grooves to be in line and equal to the number of corners in said multilayers of blanks.

FIG. 13A is an inverted plan view of said hole in block showing (6) grooves equally spaced one half of which are shown concave and the other half V-shaped, either one of which may be cut all around.

FIGS. 15 to 24 and 14 and 35 are plan views looking into cups produced from the surrounding polygonal blanks shown in phantom, while FIGS. 15A to 24A and 14A and 35A, situated directly below each nominal plan figure are side views of each respective plan figure directly above. The side views of the cups shown may be cylindrical, conical, or truncated, inverted pyramids with a square, hexagonal or octagonal cross section. The mouth edges of the cups may be plain and level, plain and wavy, curled, U-shaped, flared or flanged, and the bottom of any cup may be flat, dished or otherwise recessed. The cup in FIGS. 22 and 22A has a tapered or cylindrical side wall with folded or pleated wrinkle formation pressed or rolled over. The cup in FIGS. 14 and 14A (on drawing #3) has a triangular and tapered side wall with truncated corners.

The cup 35 and 35A (at bottom of drawing #4) has a cylindrical or tapered side wall, with tapered, concave or V-grooved projections which terminate in a flared mouth edge so as to result in a mouth edge which is preferably level with the slightly flared mouth edge between the said projections. The die in FIGS. 13 and 13A may be used to form a plurality of these cups by extrusions.

In FIGS. 23 and 23A two nesting cups are shown having a tapered or conical side wall with octagonal cross section which may be hexagonal instead. The mouth edge may be plain and level or flared, and two or more such cups may be formed with each stroke of a single combination blanking and drawing punch, or the cups may be pressed into a cavity by a punch, with both punch and cavity having corresponding polygonal and tapered outline, wherein the corners of blank are in alignment with the corners of cavity and punch. The same may be the case with cup in FIGS. 35 and 35A.

FIGS. 25 to 34 are plan views of single row blanking stocks for washers, etc., from which either one or two whole or two halves of a whole blank may be severed from the stock with each stroke of a single punch, and the blanks severed may be square, rectangular, hexagonal, octagonal, triangular, rhombuses, rhomboids, trapezoids, etc. The corners of square, triangular, rectangular, rhombuses, etc., may have one, two, or all corners beveled or truncated by notching of the stock, while triangular blanks with one truncated corner may be produced without notching. The blanks may have holes pierced as shown to be used as polygonal washers, etc.

FIGS. 42 to 44B and FIG. 50 are plan views of multi-row-blanking stock of two, three or more rows, from which the leading blank of each row is simultaneously severed from its stock and the blanks severed may be square, hexagonal, octagonal, etc. The square blanks may have the corners beveled, concaved or V-recessed all of which are produced by the notching of the lateral edges of stock and by punching or piercing square or round holes into the stock between the blanks. Only hexagonal blanks in the outer rows need notching of stock at both lateral edges while the intermediate corners of hexagons are produced by form punches with three or five sides of a hexagon being cut by such a punch. Octagonal blanks may be arranged in line and crosswise to the stock or overlappingly offset. The latter results in greater saving of stock between the blanks and consequently a smaller stock width is required. The same is true with elongated or stretched octagonal blank layouts. The blanks may have a central hole punched to serve as washers, etc.

FIG. 50A is a plan view of a single row blanking of square blanks with offset convex corners.

FIG. 45 is a plan view of a single row blanking stock from which rectangular blanks having notched corners as well as two transverse medial notches, are severed from its stock following the punching of a bolt hole into each half of the rectangular blank. The blank to be folded into a U-shape at the medial notches as shown in FIG. 45A to serve as spring washer for nuts, etc. as shown in FIG. 45B. The washer may be S-shaped as per FIG. 45C.

FIGS. 46 to 49 and 51 to 53 are plan views of additional single row blanking stock from which either one blank, as shown, or two blanks, may be severed from the stock by each stroke of a single punch. The stock for the decagonal blank in FIG. 46 and the dodecagonal blank in FIG. 47 may have a duplex notching punch or two separate notching punches at each side of stock, both of which are shown. For two or more rows of blanking stock the blanks are overlappingly interposed as shown in phantom to result in greater saving of stock.

FIGS. 51, 52 and 53 are plan views of single row blanking stock from which round blanks with two opposite flats are produced as shown in FIG. 51, round blanks with offset opposite flats produced in FIG. 52, and two offset convex corners of a square blank are produced at both separation-ends of blank in FIG. 53.

A detailed description of drawing follows herewith, in which similar reference characters refer to similar parts throughout the several views:

Figures 1, 1A:
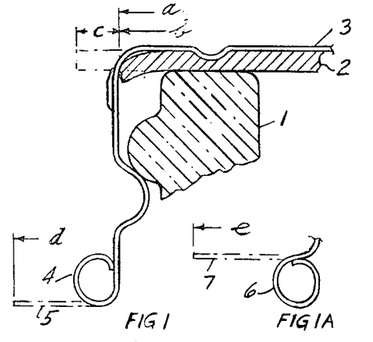

FIG. 1 illustrates a threaded container neck 1 which opening is sealed by a conventional round liner 2 compressed by a conventional sheet metal screw cap 3 in threaded engagement with container neck. Cap 3 has a regular curled edge 4 produced by roll-curling of flange 5 having a diameter $d$. Cap 3 may instead have an inverted curl 6 as shown in FIG. 1A and which curl is produced by the inverted roll-curling of flange 7 having a diameter $e$. Cap 3 has an inside diameter $a$ and liner 2 has a diameter $b$ produced with marginal stock waste $c$ shown in phantom.

Figure 1B:
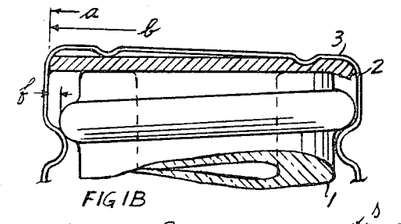
FIG. 1B is an elevational view of a threaded container neck as in FIG. 1 and which mouth is sealed by the same liner within the same cap as in FIG. 1, except that the cap is shown tilted and the liner non-uniformly compressed caused by the radial shifting of cap relative to neck.

FIG. 1B illustrates cap 3 in tilted and eccentric position on container neck caused by a lateral shift of cap relative to neck and which lateral shift results in space $f$ while the tilting of cap causes a non-uniform compression of liner as shown. A lateral shift of cap is always possible due to excessive clearance between cap and neck as a consequence of shrinkage of glass and which lateral shift results in a higher point of engagement of cap and glass thread at one side and a corresponding lower point of engagement at the diametrically opposite side, all because of the rounding or circular cross section of threads in both cap and neck. It can, therefore, be seen that partial compression of liner due to tilting of cap causes leakage or at least evporation of the contents of container and which leakage or evaporation leads to spoilage of the contents, the consumption of which creates a serious health hazard.

The caps are usually overtightened to temporarily eliminate leakage. However, such remedy is of short duration since overtightening exceeds the elastic limit of both cap and liner thereby causing a more serious leakage of contents stored away, in view of the lost resilience in both cap and liner and also because of shrinkage of liner thickness.

Figure 1C:
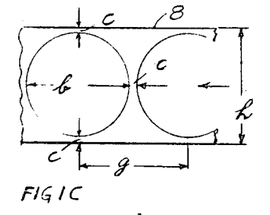
FIG. 1C is a plan view showing the conventional circular blanking of liners.

FIG. 1C illustrates the conventional liner stock 8 for liner diameters $b$ while punching-out requires a minimum marginal waste thickness $c$, resulting in a center distance of blanked holes $g$ and a stock width $h$.

Figures 1D, 1E, 1F, 2E, 2F, 2G, 2H, 2J:
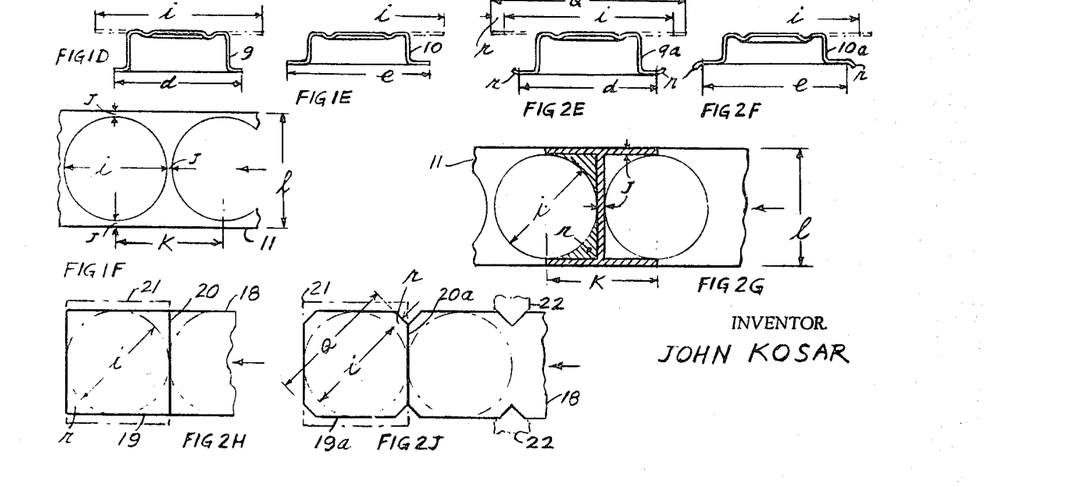
FIG. 1D is a sectional elevation of a conventional cap shell having a height and flange diameter for a regular curled edge.
FIG. 1E is a sectional elevation of a conventional cap shell having a height and flange diameter for an inverted curled edge.
FIG. 1F is a plan view showing the conventional circular blanking of cap shells.
FIG. 2E is a sectional elevation of my cap shell having a height and flange for a regular curled edge except with corner portions projecting from the edge of conventional flange diameter.
FIG. 2F is a sectional elevation of my cap shell having a height and flange for an inverted curled edge except with corner portions projecting from the edge of conventional flange diameter.
FIG. 2G is a diagrammatic plan view illustrating my square cap-shell blank within the conventional round cap shell blank and conventional stock width as shown in FIG. 1F, thereby emphasizing the surrounding waste of stock required for round blanks.
FIG. 2H is a plan view showing the blanking of my square cap-shell blanks without beveled corners.
FIG. 2J is a plan view showing the blanking and notching of my square cap-shell blanks with beveled corners.

FIG. 1D illustrates the conventional cylindrical cap shell 9 for cap 3 and having flange diameter $d$ for the regular curl.

FIG. 1E illustrates the conventional cylindrical cap shell 10 for cap 3 and having flange diameter $e$ for the inverted curl. Cap shell 10 is shallower and its flange diameter correspondingly greater than that of cap shell 9 because of the inverted curling of flange.

FIG. 1F illustrates a conventional sheet metal stock 11 for punching out blank diameters $i$ for drawing either conventional flanged shell 9 or 10. The punching out of blanks $i$ require a marginal minimum waste thickness $j$ resulting in a center distance of blanked holes $k$ and a stock width $l$.

Figures 2, 2A:
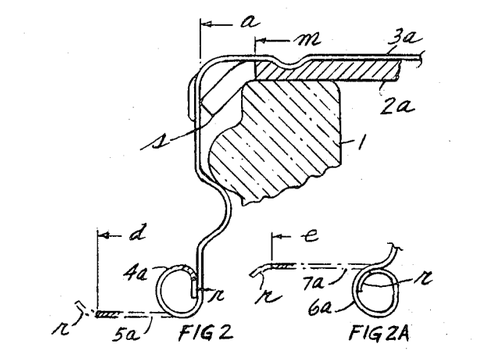

FIG. 2 illustrates a threaded container neck 1 which opening is sealed by a square liner 2a compressed by a sheet metal screw cap 3a in threaded engagement with said neck. Cap 3a has a regular curled edge 4a produced by roll-curling of flange 5a having a basic flange diameter d and upwardly curved corner portions r projecting therefrom.

Cap 3a may instead have an inverted curl 6a as per FIG. 2A and which curl is produced by the inverted roll-curling of flange 7a having a basic diameter e and downwardly curved corner portions r.

Figure 2B:
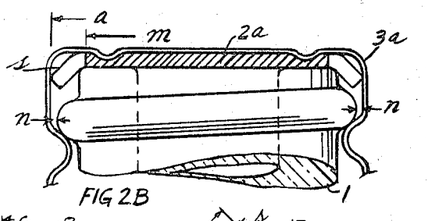
FIG. 2B is a view like that of FIG. 1B except that the cap is shown non-tilting and concentric with neck of container, and the liner is shown uniformly compressed as a result of the downward bending of its corner portions.

Liner 2a has a basic diameter m and corner portions s projecting therefrom. Cap 3a has an inside diameter a which is substantially smaller than the diameter over the corner portions s of liner 2a, thereby causing the corner portions to bend down around outer corner of wall-end of neck l. The downwardly bent corner portions urge centering of cap with neck similar to a hollow cone-ring engaging and wedging over the end of a cylinder as illustrated in FIG. 2B. Centering of cap, as evidence by the equal clearance n between cap and neck, results in a uniform compression of liner, required for an effective and lasting seal.

Figure 2C:
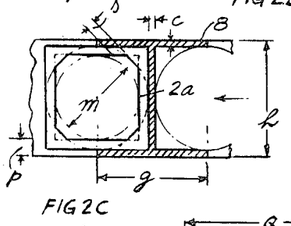
FIG. 2C is a diagrammatic plan view illustrating my square liner blank within the conventional round liner blank and conventional stock width as shown in FIG. 1C, thereby emphasizing the surrounding waste of stock required for round liners.

FIG. 2C shows my square liner 2A within the conventional stock width h and within the conventional round liner shown in phantom (and designated as b in FIG. 1C), in order to illustrate the saving of stock thru the use of my square liner. As indicated, the conventional stock width h is reduced a distance of $2 \times p$, and the conventional center distance g reduced a distance of $2 \times p - c$. In explaining, c represents the minimum marginal border required for round blanks while $p - c$ represents the radial distance of $$\frac{a-m}{2}$$

as per FIGS. 2 and 2B.

FIG. 2D illustrates my square liner 2a severed from its stock 13 at line 14 by punch 15. The longitudinal edges of stock are notched by punches 16 for producing beveled corners 17 in my square blank 2a, to result in a distance o across the beveled corners of liner. As evidenced by the inscribed or basic circle m my stock width and center distance of blanks are equal. The distance $$\frac{o-m}{2}$$

equals s and which distance represents the corner portions projecting from the basic liner diameter m. The corner portion s is also designated in FIGS. 2 and 2B and may be increased or decreased to suit by lessening or increasing the amount of notching by punch 16. Instead of being square, my liner may be hexagonal or octagonal, etc.

FIG. 2E illustrates my flanged cylindrical cap-shell 9a having a basic flange diameter d and upwardly curved corner portions r for producing a regular curl 4a shown in FIG. 2. The cap shell 9a is produced by die-forming of a square blank having a basic diameter i and a diameter q across corners of blank, resulting in corner projections r. The cap shell 9a must be roll-formed for producing cap 3a in FIG. 2. Instead of being square, the blanks may be hexagonal or octagonal, etc. The top of cap-shell may be without bead.

FIG. 2F illustrates my flanged cylindrical cap-shell 10a which is similar to that in FIG. 2E except that its height is shallower and its basic flange diameter e correspondingly greater than d in FIG. 2E, while its corner portions r are instead downwardly curved for producing an inverted curl 6a (shown in FIG. 2A) during roll-forming of shell to produce cap 3a. It's the inverted curling of flange which increases the height of shell during roll-forming, so as to arrive at a completed cap height which is equal to that with the regular curl. This cap-shell is produced from the same basic blank diameter and also the same diameter across corners of blank as that in FIG. 2E.

FIG. 2G illustrates a blanking stock 11 for round sheet metal blanks i which are the same as that in FIG. 1F except that here the minimum marginal waste thickness j surrounding the round blank i is hatched in. It is this waste thickness j by which amount the stock width and center distance for my square or other polygonal blanks is reduced and which reduction constitutes a saving of stock. In utilizing the also hatched-in corner portions r situated diagonally between the round blank i and the marginal thickness j constitutes an additional saving of stock since these corner portions are an additional waste with the round blanks i.

FIG. 2H illustrates my sheet metal stock 18 for severing square sheet metal blanks 19 at parting line 20 by punch 21. In utilizing the full area of the diagonal corner portions r situated beyond the basic or inscribed circle i results in zero waste.

FIG. 2J is the same as FIG. 2H except that the corner portions r of sheet metal blank 19a are beveled by notching punches 22. The amount of beveling may be as desired.

Figure 3:
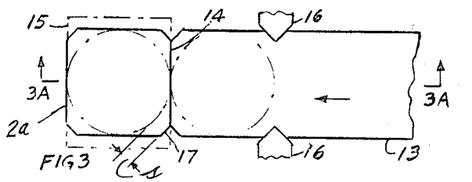
FIG. 3 is a plan view showing the outline of liner stock, notching punches and the severance punch for my square liner produced by die shown in FIG. 3A below.

FIG. 3 represents a schematic plan view of my liner blanking stock and punch layout similar to that in FIG. 2D except with a section taken at 3A—3A for showing a sectional elevation of my liner die in FIG. 3A below.

Figure 3A:
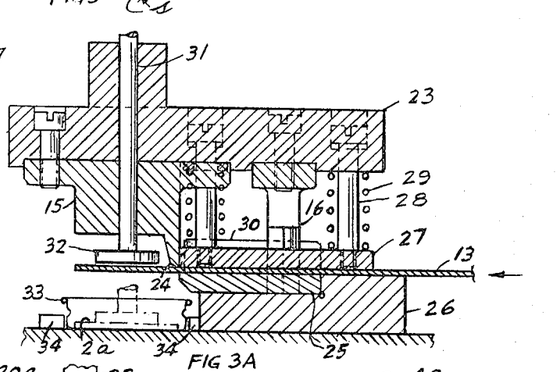
FIG. 3A is a sectional elevation of a liner severing- and notching-die, with section taken at 3A—3A in FIG. 3.

FIG. 3A illustrates by liner blanking- and insertion-die wherein the severance punch 15 fastened to punch holder 23 is provided with a shearing edge 24 making contact with liner stock 13 for severing blank 2a (at line 14 shown in FIG. 3) in cooperation with stationary shearing plate 25 fastened to block 26. The shearing edge 24 may be oblique to shearing plate 25 for gradual severing of blank 2a.

A stripper plate 27, held floatingly by screws 28 to punch holder 23 and backed up by springs 29, serves to clamp the liner stock 13 against top of shearing plate 25 during the downward stroke of punch 15. Two opposite notching punches 16 fastened to punch holder 23 produce bevels 17 in square liner blank 2a by notching the lateral edges of liner stock 13. Two side-walls 30 serve to laterally guide the stock 13 which is interruptedly fed a distance m in the direction indicated by the arrow. Punches 16 may be like that in FIG. 42A.

A spring backed rod 31 within the punch 15 and having a disk 32 at its lower end, serves to push the severed liner blank into cap 33 and which cap is brought into axial register with liner blank by guides 34. End surface of disk 32 may have concentric grooves to facilitate concentric insertion of liner 2a into cap 33.

Figures 3B, 3C:
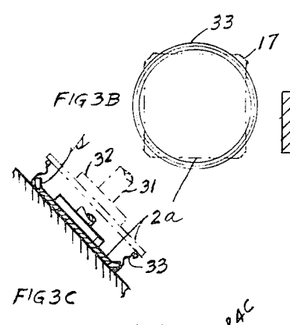
FIG. 3B shows how my square liner makes initial contact with the mouth edge of cap during its insertion into the cap.
FIG. 3C shows my square liner fully inserted into the cap and illustrating how the corners or prongs of liner are bent by the cap.

FIG. 3B shows my square liner blank 2a in central position over the mouth edge of cap 33, immediately before its insertion into cap while FIG. 3C shows the liner 2a fully inserted into the cap by disk 32 and having the corner portions s bent by the smaller I.D. of cap 33.

Figure 4:
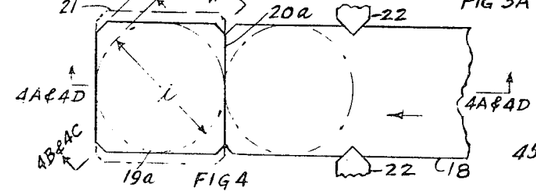
FIG. 4 is a plan view showing the outlet of a sheet metal-stock, notching punches and the severance punch for my square cap-shell blanks severed by die shown in FIG. 4A.

FIG. 4 represents a schematic plan view of my sheet metal blanking-stock and punch-layout similar to that in FIG. 2J except with a section taken longitudinal of the stock and a section taken diagonally of the leading blank, for the purpose of showing sectional elevations of my sheet metal blanking and drawing die at both said longitudinal and diagonal sections and for both types of cap-shells, i.e. FIG. 2E and FIG. 2F. The blank size being the same for both types of cap-shells.

Figure 4A:
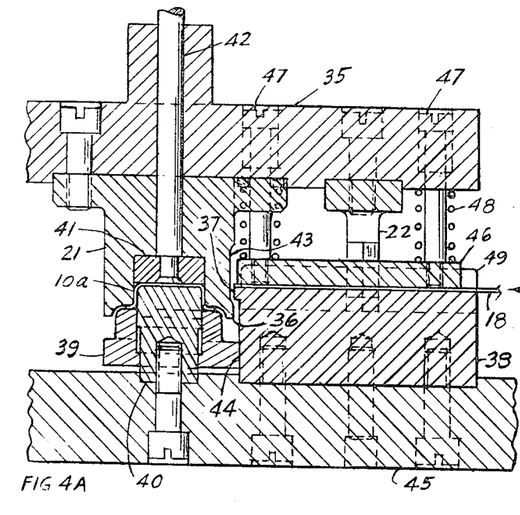

FIG. 4A represents the general structure of my die at said longitudinal section and is suitable for both types of cap shells except that the ends of drawing punch and pressure ring change to accommodate the downwardly curved corner portions r of the shallow cap-shell having the greater flange diameter as shown in FIG. 2F, and to accommodate the upwardly curved corner portion r of the tall cap-shell having the smaller flange diameter as shown in FIG. 2E. The top of cap-shell 10a may be without a bead as shown.

Figure 4B:
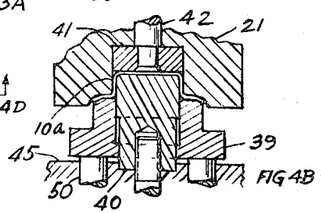
FIG. 4B shows the same cap-shell drawn from same blank except at section 4B of FIG. 4 and illustrating how the corner portions projecting from said basic flange edge are downwardly curved by the die for subsequent roll-curling of flange for an inverted curl.

Accordingly, the ends of my drawing punch and pressure ring as shown in FIG. 4A, are designed for the shallow cap-shell (shown in FIG. 2F) having the greater flange diameter and downwardly curved corner portions r, and with section taken between the corner portions of blank and between corners of flange of cap-shell, while FIG. 4B shows a section taken at the corner portion of this cap-shell or diagonally of the leading blank in FIG. 4.

Figure 4C:
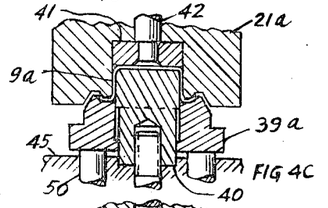
FIG. 4C is a fractional sectional elevation of die, showing the cap shell drawn from blank at section 4C of FIG. 4, wherein the corner portions projecting from the basic flange edge are shown upwardly curved by the die for subsequent roll-curling of flange for a regular curl, while in FIG. 4D the cap shell drawn by same die and from same blank at section 4D of FIG. 4, shows the shell at the basic flange diameter.
Figure 4D:
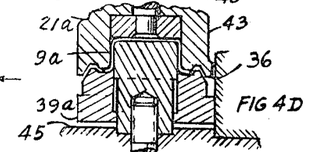

FIG. 4C shows the ends of drawing punch and pressure ring for the tall cap-shell 9a of FIG. 2E, having the smaller flange diameter and upwardly curved corner portions r and with section taken at the corner portions of cap-shell flange or diagonally of the blank in FIG. 4, while FIG. 4D shows a section taken between the corners of cap-shell or blank.

In describing FIG. 4A (which represents a section taken at 4A—4A in FIG. 4), the combination shearing and drawing punch 21, fastened to punch holder 35, is provided with a shearing edge 36, which in cooperation with the stationary shearing edge 37 of block 38, has severed the leading blank 19a at 20a from stock 18, shown in FIG. 4, and the punch has drawn said blank in cooperation with pressure ring 39, over plug 40, into a flanged cylindrical cap-shell 10a, shown also in FIG. 2F. The lower end of punch 21 and upper end of pressure ring 39 are formed to produce a flange with downwardly bent corner portions. Shearing edge 36 may be oblique to shearing edge 37 for gradual severing of blank 19a.

A knockout pad 41 attached to spring backed rod 42 serves to eject said cap shell on the upward stroke of punch 21. Punch 21 is provided with a lateral recess 43 to reduce the rubbing area with the cutting edge 37 on its upward and downward stroke, while the shearing block 38 is provided with a lateral recess 44 to reduce the rubbing area with cutting edge 36 of punch 21.

Recess 44 is also engaged by one face of a rectangular flange of pressure ring 39, to prevent its rotation around plug 40. Plug 40 and block 38 are recessed into die-shoe 45 and fastened thereto. The recess for plug 40 is circular while that for the die-shoe is a transverse slot. A stripper plate 46, held floatingly by shouldered screws 47 to punch holder 35, and backed up by springs 48, serves to clamp the sheet metal strip-stock 18 against top of shearing block 38 during the downward stroke of punch 21.

Two opposite notching punches 22, fastened to punch holder 35 produce bevels in corners of blank 19a by notching of the lateral edges of stock 18.

Two side walls 49 secured to block 38, serve to laterally guide the stock 18, which is interruptedly fed a distance i in the direction indicated by an arrow. This distance i is equal to the diameter of the inscribed circle of square blank shown in FIG. 4 and consequently is also equal to the stock width and feeding stroke.

Punch 21 and notching punches 22 are fitted into transverse slots in punch holder 35 and fastened thereto. Punches 22 may be like that in FIG. 42A.

In FIG. 4B the spring-backed pressure pins 50 urge pressure ring 39 up against lower end of punch 21 to resist the forming of wrinkles during the forming of the flange of cap-shell 10a. The pins 50 in FIGS. 4B and 4C may enter a bored recess which may be provided in bottom of ring 39 to thereby eliminate guiding said ring at 44 in FIG. 4A.

FIG. 4B represents a section of die which lies across corners of cap-shell or diagonally of blank 19a in FIG. 4. The lower portion of plug 40 has a reduced diameter forming a shoulder with its upper diameter, and the upper portion of pressure ring 39 has an I.D. engaging said upper diameter of plug while having an offset lower flange diameter engaging said reduced lower diameter of plug. The upper face of said flange is spaced from said shoulder when punch 21 is in its down-position, and said shoulder allows the pressure ring to move up with punch 21 until the top of pressure ring is flush with top of plug 40. Plug 40 may additionally be dowelled to block 45.

In FIGS. 4C and 4D the lower end of punch 21a and upper end of pressure ring 39a are formed to produce a flange with upwardly curved corner portions of cap-shell 9a, shown in FIG. 2E.

FIG. 4C represents a section taken across corners of cap-shell or diagonally of blank 19a in FIG. 4, while FIG. 4D represents a partial section of die and with section taken between the corners of cap-shell or between the corners of blank 19a at 4D—4D in FIG. 4.

Figures 5, 5A, 5B, 5C, 6, 6A:
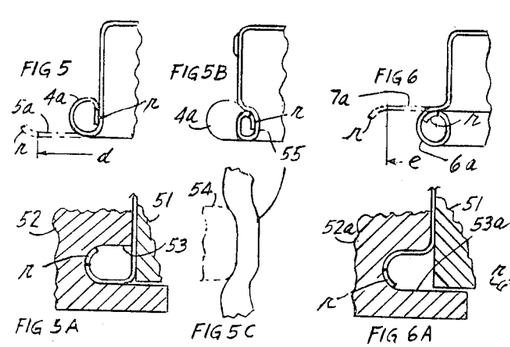

FIGS. 5 to 5C illustrate how a flanged cylindrical cap shell 9a of FIG. 2E may be rolled for producing a lug cap having a regular curled edge as shown in FIG. 5B.

In FIG. 5 the regular curled edge 4a is produced by the roll-curling of flange 5a in a manner similar to that in FIG. 2, i.e. the upwardly curved corner portions facilitate the initial roll-curling of flange 5a as exemplified by the cooperating internal and external tool members 51 and 52 shown in FIG. 5A, wherein the gradual reduction of the radial depth of curling groove 53 produces the annular curl 4a, whereupon equally spaced portions of curl 4a are pushed inwardly by the notching blade 54, shown in FIG. 5C, to form a plurality of equally spaced and inwardly projecting lugs 55 as shown in FIG. 5B. Spaced annular recesses are provided in internal tool member 51 for receiving said inwardly pushed curl portions.

Figure 6B:
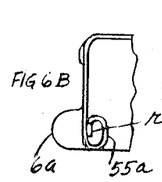
Figure 6C:
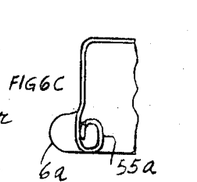

FIGS. 6 to 6C illustrate how a flanged cylindrical cap-shell 10a of FIG. 2F may be rolled for producing a lug cap having an inverted curled edge as shown in FIG. 6B. In FIG. 6, the inverted curled edge 6a is produced by the roll-curling of flange 7a in a manner similar to that in FIG. 2A, i.e. the downwardly curved corner portions r facilitate the initial roll-curling of flange as exemplified by the cooperating internal and external tool members 51 and 52a shown in FIG. 6A, wherein the gradual reduction of the radial depth of curling groove 53a produces the annular curl 6a, whereupon equally spaced portions of curl 6a are pushed inwardly by the notching blade 54 of FIG. 5C for forming a plurality of equally spaced and inwardly projecting lugs 55a as shown in FIG. 6B. The curl 6a may be pushed in to be flush with O.D. of cap or be outwardly offset as shown in FIG. 6C, or the curl may be pushed in further so as to be inwardly offset with the O.D. of cap. Spaced annular recesses are provided in internal tool member 51 for receiving said inwardly pushed curl portions.

Figure 7:
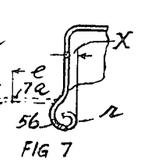
FIG. 7 is a fractional sectional view of a completed cap wherein the corner portions of flange are curved downwardly for inverted roll-curling of flange, and wherein the corner portions are roll-curled to project inwardly past the I.D. of cap to form lugs, while the basic flange portion is rolled to form an annular bulge projecting outwardly from the O.D. of cap and wherein the basic flange edge is shown flush with the I.D. of cap.
Figure 7A:
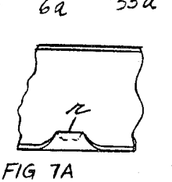
FIG. 7A is an interior view of a lug shown in FIG. 7.
Figure 15:
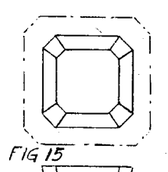
Figure 15A:
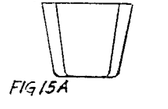
Figure 16:
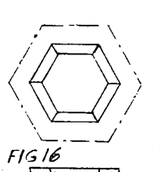
Figure 16A:
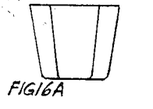
Figure 17:
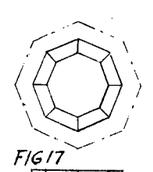
Figure 17A:
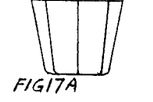
Figure 18:
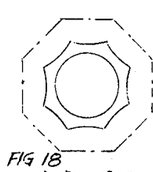
Figure 18A:
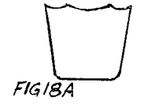
Figure 19:
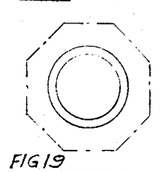
Figure 19A:
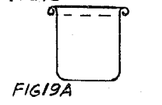
Figure 20:
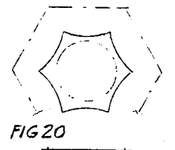
Figure 20A:
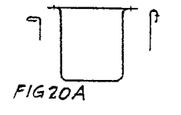
Figure 21:
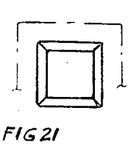
Figure 21A:
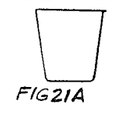

FIGS. 7 and 7A illustrate how a flanged cylindrical cap shell 10a of FIG. 2F may be rolled for producing a lug-cap having an inverted, resiliently curled edge as shown in FIG. 7, wherein only the curled corner portions r of the invertedly curled flange 7a are rolled to project inwardly of the I.D. of cap, while the remainder of the curved flange projects outwardly to form a continuous annular bulge 56. In this way, the corner portions of flange are fully utilized for direct engagement with lugs of container neck, instead of being curled-in as in FIG. 5B or 6B. The number of curled lugs in cap may be equal to the number of corners in the blank. An annular recess is provided in the internal tool member to permit the entering of curled corner portions so as to project inwardly of the I.D. of cap a distance X. Here the saving of material is twofold, i.e. thru the elimination of the marginal stock waste and thru the use of the corner portions.

FIGS. 8 to 8B illustrate how a flanged cylindrical cap-shell 10a of FIG. 2F may be rolled for producing a lug cap having an inverted, resiliently curled edge as shown in FIG. 8, and wherein flange 7a is invertedly roll-curled to produce an uninterrupted annular bulge 56a, projecting outwardly of the O.D. of cap, and wherein the internal tool member is provided with spaced annular recesses, and wherein an end-portion of flange 7a is roll-curled to enter said recesses for forming lugs 57 projecting inwardly of the I.D. of cap as shown in FIG. 8B and FIG. 8, while the curled portions between the lugs are flattened by said internal tool member so as to be flush with the I.D. of cap as shown in FIG. 8A. The container neck 58 has a plurality of thread-lugs 59 shown engaged by cap lugs 57, while a polygonal liner 2a is being compressed by the cap for sealing the opening of neck.

The corner portions r, while not shown in engagement with container lugs, may be curled to engage or contact the container lugs in whole or part.

FIG. 9 illustrates how a flanged cylindrical cap-shell 10a of FIG. 2F may be roll-formed for producing an invertedly curled flange edge of somewhat circular cross section and having an uninterrupted annular bulge 56b projecting a substantial amount outward of the O.D. of cap while its curved corner portions r on the inside are rolled to be in line with the I.D. of cap or rolled to project slightly inward of the I.D. Said cap in FIG. 9, having a polygonal liner 2b, is shown assembled with a container neck 60 having an annular groove 61 similar to that for the conventional crown cap.

A sealing chuck 62, having a spring-backed pad 63 exerting pressure upon the cap to compress its liner 2b for sealing the opening of container neck, and said chuck having ribbed lateral means 64 shown in initial wedging contact with the upper portion of bulge 56b in FIG. 9, and said ribbed lateral means in FIG. 9A form axial furrows 65 around bulge 56c, as shown in FIG. 9B, while simultaneously contracting the diameter of said bulge during the downward stroke of said sealing chuck, resulting in a firm, yet resilient engagement of said curved corner portions r with the inverted shoulder formed by said annular groove 61 in container neck as shown in FIG. 9A.

Said ribbed means 64 diverge at their lower end, thereby facilitating the initial engagement with bulge 56b of FIG. 9. The forming of said furrows in FIG. 9A and as shown in completed cap 9B, serve to absorb the difference in circumference between bulge 56c of FIG. 9A and bulge 56b of FIG. 9 during contraction of the bulge diameter by said ribbed means 64.

The cap shown in FIG. 9C is a modification of that shown in FIG. 9A in that its resilience is increased by the upwardly extending annular bulge 66 in top corner of cap while its application with container neck 60a is facilitated by the conical upper wall surface 67 of neck. Here the curved corner portions r may be rolled to project somewhat inwardly of the I.D. of cap for a snap engagement with said inverted shoulder, since a snap engagement is facilitated by the conical surface 67.

The liner may be cork or any other suitable material. The number of engaged corner portions r are equal to that of the blank and may be eight or less or more than eight. The major advantages over the conventional crown cap include dual saving of cap metal, elimination of exposed raw edge, saving of liner material, centering of cap, self retainment of liner and a resilient seal.

FIG. 10 represents a cap which is similar to the common crown cap except that my crown cap has preferably 8, 10 or 12 ribs while the common cap has 21 ribs. The polygonal blank severed by the die, is immediately drawn by the same die to its completion, whereupon my polygonal liner is inerted. The cap, as die-formed, is shown assembled with a conventional container neck 60 having an annular groove 61. The corner portion r projecting from basic blank i may be drawn by the die so as to either coincide with the center line of the ribs 68 or with the center line of space 69 between the ribs 68. FIG. 10A shows an inverted view of rib 68. A conventional sealing chuck 70 may be used to depress the ribs 68 thereby causing the metal and knee between the ribs to move inwardly for engagement with the inverted shoulder of neck formed by said annular groove 61. The major advantage over the common crown cap includes dual saving of cap metal, saving of liner material, self retainment of liner and centering of cap with container neck.

In FIG. 11, the longitudinal edges of sheet metal strip stock 71 are notched by opposite punches 72 for producing a leading hexagonal blank 73 severed by punch 74 at line 75. The feeding stroke of the stock is equal to the diameter of inscribed circle i of blank, while the stock width is equal to the distance across corners of blank, and distance r is the radial distance between distance across corners and i diameter of blank. The blank may be drawn into a flanged cylindrical cap shell, etc., immediately after the severance from its stock or be used in a flat state for a washer, etc.

In FIG. 12 the description is similar to that of FIG. 11 except that the stock 71a is notched by 90° notching punches 72a for producing octagonal blank 73a, and the stock width in this case being equal to the distance across two opposite sides of the octagonal blank.

FIG. 13 illustrates a simple die for producing paper, foil, or cups of other material, by extrusion from a single or multi-layer stock.

As shown, a shearing punch 76 having a shearing edge 77 in contact with a multi-layer strip stock 78 for severing the leading hexagonal blanks 79 in cooperation with a stationary shearing plate 80 from said stock 78, i.e., following the notching of the lateral edges of said stock by notching punches, not shown. Said shearing plate 80 is fastened to extrusion block 81 having a hole 82 having six concave lateral grooves 83 or six V-grooves 83a. Said grooves are in alignment with the corners of said hexagonal blanks 79 about to be severed by the shearing punch 76. An extruding plug 84 within punch 76 is positioned centrally over the extrusion hole 82 and serves to push the severed blanks thru said hole thereby producing a plurality of nesting cups with each stroke. The upper edge of extrusion hole is rounded off to facilitate the initial drawing of the blanks into the hole 82. An extruding plug 84 connected to rod 85, is being operated by said rod sliding within punch 76 and which rod may be reciprocally actuated by the end of a pivoting lever and a spring return action.

A stripper plate 86 serves to clamp stock 78 up against shearing plate 80 during the severance of the leading blanks from the stock 78, while two opposite side walls 87 serve to guide the stock during the feeding strokes similar to dies in FIGS. 3A and 4A.

Figure 35:
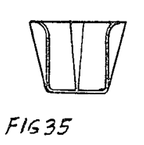
Figure 35A:
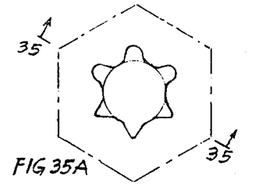
Figure 36:
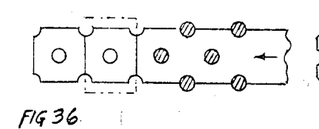
FIGS. 36 to 41 are plan views of additional single row blanking stock, from which either one or two blanks may be severed from the stock with each stroke of a single punch, and the blanks severed may be square, hexagonal, octagonal, or triangular, etc., except that the corners or sides of blanks may have concave recesses punched in as shown to give the blanks either a decorative or other purpose outline or effect and the blanks may have a bolt hole punched into their center for use as washers, etc.

FIG. 13A shows the grooves 83 and 83a in an inverted view x—x of hole 82 and the hexagonal blank outline is shown in phantom around it. The diameter of plug 84 is determined by the allowance for the number of thicknesses of walls of cups to be extruded plus the taper desired for the side walls of cups, while the thickness of block 81 around extrusion hole is determined by the height of the cups desired. The required radial depth and shape of grooves 83 depends on a number of factors as the height of cup, taper of side walls, behavior of the material extruded or drawn, etc. The cup or cups produced by above described die may be as shown in FIG. 35 of a section taken at 35—35 of FIG. 35A.

A spring backed ring may be used around the free lower end of plug 84 for initially clamping the severed blanks down up against the extrusion block.

Plug 84 may have radial grooves between grooves 83 to allow the entering of convex wrinkles which may develop in some of the material used, or the plug 84 may have upwardly diverging radial ribs projecting from the O.D. in line with grooves 83 for assisting in the formation of upwardly diverging, ribbed wall portions of cups. Cups which may adhere to the plug 84 at end of its downward stroke are stripped off by the bottom face of plate 81 during the ascendance of said plug.

FIGS. 14 to 24A illustrate a variety of cups which may be die-formed or extruded from the surrounding polygonal blank-outline shown in phantom. The cups may be drawn or extruded with either bottom up or down, by a combination shearing drawing or extrusion die. The material of the cups may be aluminum, foil, paper, steel, etc.

As shown, the body-outline of the cups may be that of a truncated pyramid with either a triangular, square, hexagonal, octagonal or any other polygonal mouth edge or base; or the body-outline may be that of a truncated hollow cone or just plain cylindrical or prismatical. In a polygonal body-outline the number of corners are normally equal to that of blank.

The mouth edge of the cups may be curled, radially flanged, flange folded, invertedly U- or V-flanged, or have a level- or wavy single-wall edge, etc. The bottom of cups may have a concave or flat recess. The corners of triangular and square blanks may preferably be truncated or beveled as per FIGS. 14, 15 and 24 and the cups produced from such blanks have a corresponding cross sectional outline.

Figure 23:
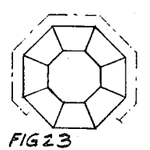
Figure 23A:
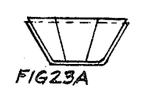
Figure 24:
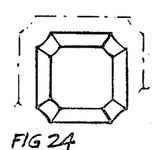
Figure 24A:
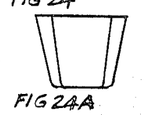
Figure 25:
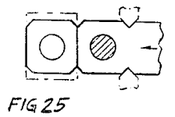
Figure 25A:
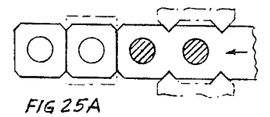
Figure 26:
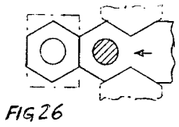
Figure 26A:
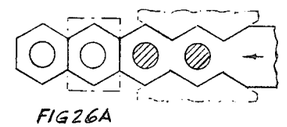
Figure 27:
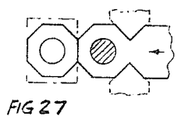
Figure 27A:
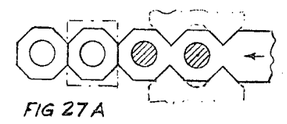

A single blank may be severed from a single row blank-stock and immediately drawn into a cup by the same punch similar to FIGS. 25, 26 and 27, or two blanks may be severed from a single row stock by one slot-punch similar to FIGS. 25A, 26A, 27A and 28A and the blanks stacked for die-forming one blank after another into cups. Two or more nesting cups as shown in FIGS. 23 and 23A may be formed from a plurality of stacked blanks.

Figure 22:
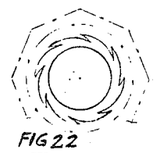
Figure 22A:
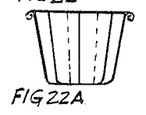

Cylindrical or conical cups with pleated or folded side wall may be die-formed or extruded and the mouth edge curled as shown in FIG. 22A. The folds in side wall to be turned in one circular direction and flattened followed by curling of the mouth edge.

Figure 28:
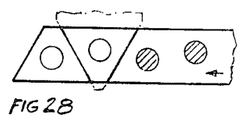
Figure 29:
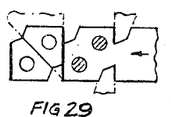
Figure 29A:
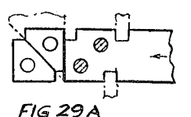
Figure 30:
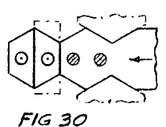
Figure 31:
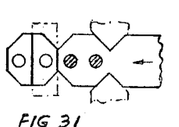
Figure 32:
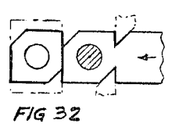
Figure 33:
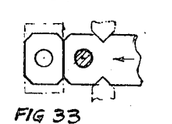

FIGS. 25 to 34 each illustrate a single row blanking stock wherein both longitudinal edges of stock are notched for producing a variety of blanks of polygonal outline, or produce beveled corners in square or rectangular blanks and which blanks have holes punched to be usable as washers, etc. FIG. 28 being an exception since no notching is required.

In FIGS. 25, 26, 27, 32 and 33, the single row blanking stock is singly notched at both lateral edges and has one hole punched for producing one washer with each stroke of severance punch.

In FIGS. 25A, 26A, 27A, 28A and 34, the single row blank stock is doubly notched at both sides and has two holes punched for producing two washers with each stroke of severance punch. In FIG. 28 two blanks are produced with each stroke of severance punch without notching of stock.

In FIGS. 29, 29A, 30 and 31, the single row blank stock has a single notch at both longitudinal sides for one leading polygonal blank and which blank is split into two equal halves by a slot-punch, and each half of blank has a hole punched to be usable as washer, etc. By providing dual notching at both longitudinal edges of stock and two single or one duplex slot-punch results in four blanks or four complete washers with each stroke of the two slot-punches. By omitting the punching of holes, the blanks may be used for any other purpose and either left flat or bent or drawn into shells, etc.

FIGS. 36 to 41, 46 to 49, and 50A, illustrate additional single row blanking stocks from which polygonal blanks may be produced either singly or doubly and which blanks as in FIGS. 36 to 39 may have holes punched to be usable as washers, etc. The two leading square blanks in FIG. 36 have concave corners which are produced by two opposite round notching punches at both edges of stock. A slot punch shown in phantom produces two blanks with each stroke since it severs both sides of blank it is on and thereby also severing the leading blank.

Figure 37:
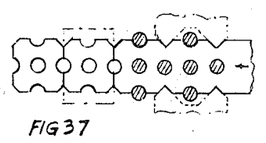
Figure 39:
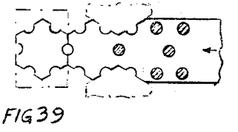
Figure 40:
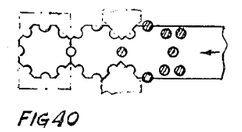
Figure 41:
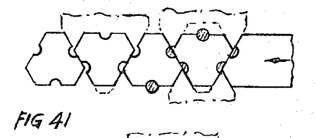

The blanks in FIGS. 37 to 41 have instead their sides semicircularly notched by round punches while having the corners beveled as in FIGS. 37 and 41, thereby producing a decorative outline.

Figure 38:
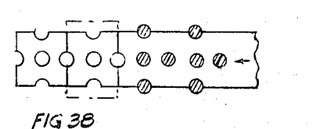
Figure 46:
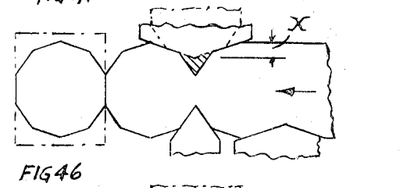
Figure 47:
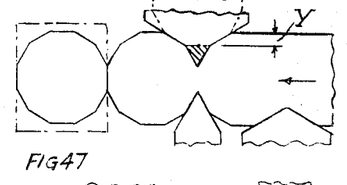

FIGS. 37, 38 and 41 are also shown each with a slot punch for producing two blanks with each stroke of punch while FIGS. 39 and 40 are each shown with a severing punch for producing one blank with each stroke of punch. The leading decagonal blank in FIG. 46 may be produced by either one combination notching punch or by two separate notching punches at both sides of stock, both of which are shown. The same applies to the dodecagonal blank produced from a single row blank in FIG. 47. In multi-row blanking of decagonal or dodecagonal blank-layouts, a reduction of stock width is obtained by an offset overlapping layout of blanks resulting in a saving of stock X and Y between the blanks, as indicated in FIGS. 46 and 47.

Figure 48:
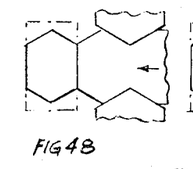
FIG. 48 shows the blanking of an elongated hexagon and FIG. 49 shows the blanking of an elongated octagon.
Figure 49:
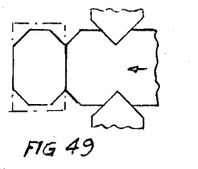

FIG. 48 illustrates a blank-layout for producing elongated hexagonal, and FIG. 49 illustrates a layout for producing elongated octagonal blanks.

FIG. 50A illustrates a notching of stock for producing square blanks which corners have a convex portion between right angular offsets.

FIGS. 51 to 53 illustrate additional single row blank layouts wherein FIG. 51 shows two opposite notching punches for producing circular blanks having opposite transverse flats required for severance, while the blanks produced by the notching punch in FIG. 52 are also circular but with two outwardly offset parallel sides required for severance and which sides may be tangent to the circular blanks. The nearly square blanks shown in FIG. 53 are produced by notching of convex corners which are flush with the lateral edges of stock while being offset transverse to the stock to result in an ideal parting line for the leading blank.

FIGS. 42 to 44B and FIG. 50 each illustrate a multi-row blanking stock for producing blanks from two, three or more rows, wherein the leading blank of one row is ahead of the other leading blank in the adjoining row by one or 1½ blanks measured in the direction of the feeding of stock (an exception being square and rectangular blanks with non-beveled corners and which blanks must be offset a distance of two blanks measured lengthwise of the stock).

Figure 42:
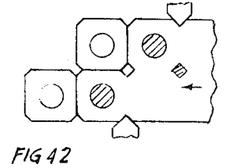

In FIG. 42 the beveled square blank in the lead is offset one blank from the leading blank in the adjoining row of the two-row blanking stock. A square punch-outline shown hatched-in and situated between the two rows produces one bevel for each of the four adjoining blanks to be, while the two offset notching punches produce the outer bevels of the two leading blanks. As shown, two hatched-in circular punches produce a hole in each blank of both rows in order to be usable as washers, etc., and as shown, the rearward leading blank must be severed at two of its sides.

Figure 42A:
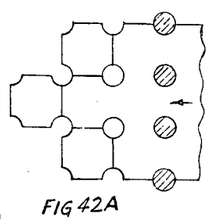

In FIG. 42A, the three-row stock for square blanks shows the leading blank in the middle row one blank ahead of the blanks in the other two rows. The corners of all blanks are notched by hatched-in round punches to produce concave corners as shown.

Figure 43:
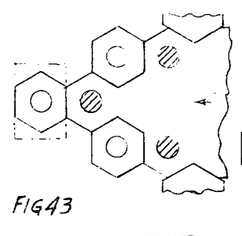
Figure 43A:
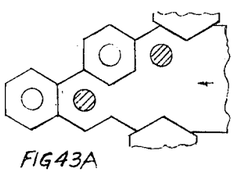

FIG. 43 shows a three-row, and FIG. 43A a two-row blanking stock for producing hexagonal blanks with holes for use as washers, etc., and wherein the leading blanks are overlappingly offset or staggered a distance of 1½ blanks measured lengthwise of the stock. Absence of waste between the rows of the hexagonal blanks should be noted and also that the rearward leading blank must be severed at three of its six sides while in a four- or five-row stock there is one leading blank which must have five sides severed, and in a six and seven row stock there are two leading blanks which must have five sides severed from the stock.

Figure 44:
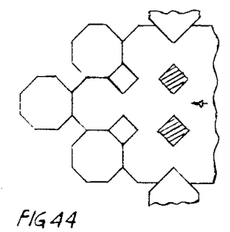
Figure 44A:
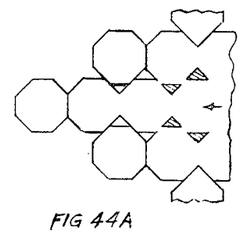

Both FIGS. 44 and 44A show three-row blanking stocks for producing octagonal blanks. In FIG. 44 the leading blank in the medium row is one blank ahead of the leading blanks in the adjoining outer rows while in FIG. 44A the leading blank in the median row is 1½ blanks ahead of the leading blanks of the adjoining outer rows and which outer blanks are overlappingly offset or staggered resulting in a reduced stock width.

In FIG. 44 two sides of each leading blank in the outer rows must be severed from the stock while in FIG. 44A one full side and two partial sides of each leading blank in the outer rows must be severed from the stock. In FIG. 44 the two square punches shown hatched-in produce each one side of each four adjoining blanks situated between the rows while in FIG. 44A four triangular punches outlined are hatched-in, each producing one full side of one blank and one partial side of each of two adjoining blanks.

FIG. 44B is similar to FIG. 44A except that the oblique sides of the octagon are extended resulting in shorter sides intersecting with the ends of the extended sides. Consequently the four hatched-in triangular punches are smaller than that in FIG. 44A.

FIG. 50 illustrates another two-row blanking stock for producing square or rectangular blanks having a right angle- or a V-notch in each corner.

FIG. 45 illustrates a single-row blanking stock for producing rectangular blanks with beveled corners and which blanks are oppositely notched at their median length and each half of blank is provided with a hole whereupon the blank is folded over at said median notches to result in a U-shaped spring- and lock-washer as shown in FIGS. 45A and 45B, for use under a nut, bolt- or screw-head. The legs of the U-shaped washer may be spaced at an angle instead of being parallel. Adding one more leg with a hole results in an S-shaped washer as shown in FIG. 45C, in which case the legs may be spaced parallel to each other.

In reviewing the specifications and drawings, the advantages of my invention may be further clarified as itemized and elaborated below.

(1) In replacing circular blanking with an open, one or more stage polygonal blanking, not only saves on material but also reduces the cost and maintenance of dies.

(2) In single row blanking two opposite sides of square, rectangular, octagonal and dodecagonal blanks are in line with the stock-width and therefore do not require severing from the stock, while in multi-row blanking one side of said blanks on both sides of stock coincides with the longitudinal edge of stock, therefore no severing is required to produce these sides.

(3) In single row blanking, the bevels of square or rectangular blanks and the oblique sides of octagonal and dodecagonal blanks are produced by notching both lateral edges of stock while the severance punch only cuts one side of the leading blank and which side lies transverse to the stock-width.

(4) In single row blanking of hexagonal and decagonal blanks two opposite corners are in line with the lateral edge of stock while the oblique sides are produced by notching both sides of stock, and the severance-punch cutting only one side lying transverse to the stock.

(5) In single row blanking of square, rectangular, hexagonal and octagonal blanks, etc., two blanks may be produced with each stroke of a rectangular slot-punch having two opposite cutting edges except that dual notching of both stock edges is required where applicable.

(6) Triangular blanks (isosceles, equilateral, acute, etc.) can only be economically produced from a single row stock and with a two-edge triangular slot-punch producing two blanks with each stroke without waste between blanks except that either one corner or all three corners of blanks must be truncated. Trapezoidal blanks may also be produced two at a time with each stroke of a two edge triangular slot-punch.

(7) Rhombuses and rhomboids may be produced singly by a severance-punch or doubly with a slot-punch except that the cutting edges in both cases are oblique to the stock width.

(8) Regular pentagonal, heptagonal and nonagonal blanks cannot be severed without waste between the leading and succeeding blank in a single row stock except if the blanks can be irregular and have 2 parallel sides for severing.

(9) Two right-triangular blanks may be produced with each stroke of a triangular slot-punch by diagonally dividing a square blank having both corners at said diagonal notched. One edge of the triangular slot-punch is cutting transverse to the stock to sever the square blank while simultaneously cutting with the other edge diagonally over said square blank to produce two right triangular blanks.

(10) Square and rectangular blanks may be divided into halves across two of their opposite sides by a slot-punch severing said blank with one edge, while dividing the blank across said opposite sides with the other edge.

(11) Hexagonal and octagonal blanks may be divided into equal halves either across two corners or across the middle of two opposite sides, by a slot punch severing either one of said blanks with one edge while dividing the blank with the other edge either obliquely or parallel to said severing edge. Decagonal and dodecagonal blanks may be divided in the same manner. A rhombus with two opposite, truncated corners may be divided into halves by a triangular slot-punch wherein both cutting edges are at an oblique angle to the stock width.

(12) In multi-row blanking of square blanks having beveled corners, the leading blanks in one row is one blank-distance behind the leading blank in the other row. In square blanks without beveled corners the rearward leading blank must be two blank-distances behind the forward leading blank. In the former the bevels between the blanks are produced by a square punch wherein each side produces one bevel of each four adjoining blanks, while the other bevels are produced by notching the stock at both its lateral edges. Instead of bevels the corners may be concave produced by round punches between the blanks as well as at both lateral edges of stock. Either one of the rearward leading square blanks must be severed at two of its adjacent sides by an L-shaped cutting edge.

(13) In multi-row blanking of hexagonal blanks there is no waste between the rows and the rearward leading blank is a 1½ blank distance behind the forward leading blank and is overlappingly offset or staggered with the adjoining blank in the other row. Lateral edges of the stock are flush with the corners of blanks in both outer rows and both lateral stock edges are notched for producing the two outer oblique sides of blanks on both sides of stock. In two or three row blanking, three of the adjoining sides of a rearward leading blank require severance from stock while in four or five row blanking one intermediate rearward leading blank requires the severing at five adjoining sides, and in six or seven row blanking each of two intermediate rearward blanks require severance at five adjoining sides.

(14) In multi-row blanking of octogonal blanks, the rearward leading blank may be one or a 1½ blank distance behind the forward leading blank. In the former, the blanks are in line transverse of the stock width while in the latter the blanks are overlappingly offset or staggered resulting in a smaller stock width. In the former, a square punch between each row of blanks produces one side of each of four adjoining blanks, while in the latter, two triangular punches between each row produce each one side of two adjoining octagonal blanks and the two oblique and shorter sides of each triangular punch cut each a somewhat more than one half of each of two adjoining blanks. In the former and latter the notching of the stock edge produces one oblique side of each of two adjoining blanks while one side of each blank in the outer row is determined by the stock width. For the rearward leading blank of the former, the severance punch is to have an L-shaped cutting edge for cutting one side of the octagonal blank which is transverse to the stock and another side which is parallel to the stock edge. For the rearward leading blank of the staggered blank-layout the severance punch is to have a somewhat semi octagonal cutting edge wherein one full side of the blank which is transverse to the stock width and two partial sides of the blank which are oblique to the stock width must be severed.

(15) Circular blanks with a slight offset as shown in

FIG. 52 may be produced without increase in stock width over the diameter of blank without waste between blanks. In fact, the diameter of blank or distance between blanks at the longitudinal centerline of stock can be equal to that across the stock or less as shown in FIG. 51. Both blanks may be used as washers, etc.

(16) The above itemized analysis of polygonal blanking and the accompanying saving of material, etc., should help to better understand the advantages over the conventional circular blanking. For example, in punching a hole into a sheet material stock it is logical that one must have stock surrounding the punch or hole. If now the blank produced by the punch is wanted, then the margin of stock surrounding the punch or hole becomes scrap. This is true whether the blank punched out is round, polygonal or any other shape. In using a strip of paper one inch wide and cutting across with a scissor at one inch distance, produces square blanks without waste between blanks nor at the lateral edges of the paper. In using the same one inch wide strip of paper and cutting out one inch diameter blanks, without allowing a marginal waste between the blanks at the longitudinal center line of strip, would make it impossible to automatically feed such a strip of paper since the opposite V-shaped scrap portions at the lateral edges of stock would lose their connection with each other. By cutting straight across said one inch wide paper automatically produces the rearward side of the leading square blank and the forward side of the succeeding square blank. This, however, is not possible with adjoining round blanks since they curve away from each other in opposite direction. Therefore, because of the straight sides in polygonal blanks it is possible to sever them without waste between, while on the other hand one may have curved opposite notching of stock as in FIG. 52 to produce a nearly circular blank. No closed holes as with conventional circular blanking is required to be punched into the stock when producing polygonal blanks.

(17) Of course, all my polygonal flat blanks may be bent, drawn or extruded into cap shells, cups, cup washers, flanged lids or covers, etc., with or without the utilization of the corner portions projecting therefrom. Irregular pentagonal, heptagonal and nonagonal blanks may be severed without waste between 2 adjoining blanks if they are allowed to have 2 parallel sides for severing.

I claim as my invention:

1. A closure cap for a container having an opening, a liner within said cap for sealing said opening, said liner having a polygonal peripheral outline, the diameter across the corners of said outline is greater than that of the inside diameter of the skirt of said cap a sufficient amount to cause an angularly downwardly and outwardly bending of the corner portions of said liner upon its insertion into said cap to thereby be frictionally retained therein by the cap.

2. The closure cap as in claim 1, wherein said cap is produced from a flat sheet metal blank bounded by at least five intersecting sides forming salient corners, said cap comprising a circular top portion, a skirt portion depending from the peripheral edge of said top portion, a flange portion projecting radially from the lower end of said skirt portion, the peripheral portion of said flange is curved in one of two axial directions.

3. The sheet metal cap as in claim 2, wherein said skirt portion is provided with a thread for engagement with a corresponding thread of a container, and wherein said flange portion is curled to result in a curled edge of said skirt.

4. The sheet metal cap as in claim 2, wherein said flange portion is curled to result in a curled edge of said skirt, and said curled edge having a plurality of angularly spaced lug portions projecting radially inwardly of said skirt portion for engagement with corresponding thread portions of a container.

5. The closure cap as in claim 1, wherein said cap is produced from a flat sheet metal blank bounded by at least five intersecting sides forming salient corners, said cap comprising a circular top portion, a skirt portion depending from the peripheral edge of said top portion, the lower portion of said skirt being provided with axial ridges and valleys substantially similar to that of crown type caps.

6. The sheet metal cap as in claim 2, wherein said flange portion is invertedly curled to result in a somewhat resilient curled edge of said skirt, and said curled edge permitting a generally unobstructed axial engagement of said cap with a crown type container, and means for urging said curled edge inwardly for locking engagement with the neck of said container.

7. A one-piece cup produced from a flat sheet material blank bounded by at least five intersecting sides forming salient corners, said cup comprising a bottom portion, a skirt portion extending upwardly from the peripheral edge of said bottom portion to terminate in an optionally trimmed edge.

8. The cup as in claim 7, wherein said bottom portion is bounded by intersecting sides corresponding to that of said blank, and said skirt portion having a cross sectional outline corresponding to that of said bottom portion.

9. The cup as in claim 7, wherein said bottom portion is bounded by a circular outline, and said skirt portion having a cross sectional outline corresponding to that of said bottom portion.

10. The cup as in claim 9, wherein said skirt portion terminates in an optionally curled flange edge.

References Cited

UNITED STATES PATENTS

| 2,181,799 | 11/1939 | Carvalho | 215—40 |
| 2,309,308 | 1/1943 | Gibbs | 215—44 |
| 2,317,287 | 4/1943 | McCombs | 215—44 |
| 2,597,830 | 5/1952 | Webb | 215—44 |

FOREIGN PATENTS

| 460,398 | 8/1926 | Germany. |

JAMES B. MARBERT, *Primary Examiner.*